(12) United States Patent
Higashi

(10) Patent No.: US 7,391,318 B2
(45) Date of Patent: Jun. 24, 2008

(54) GOODS MANAGEMENT SYSTEM, INGREDIENT FREEZING SYSTEM, INGREDIENT MANAGING METHOD AND PROGRAM RECORDING MEDIUM

(75) Inventor: Mikio Higashi, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 210 days.

(21) Appl. No.: 11/269,706

(22) Filed: Nov. 9, 2005

(65) Prior Publication Data

US 2006/0113372 A1    Jun. 1, 2006

(51) Int. Cl.
G08B 1/00 (2006.01)
G08B 13/14 (2006.01)

(52) U.S. Cl. ................. 340/531; 340/572.1; 235/375

(58) Field of Classification Search ............ 340/572.1, 340/531; 235/375, 385, 383, 451, 462.01; 707/10; 705/26
See application file for complete search history.

(56) References Cited

U.S. PATENT DOCUMENTS

| | | | | |
|---|---|---|---|---|
| 5,798,694 | A  * | 8/1998 | Reber et al. | 340/540 |
| 6,285,282 | B1 * | 9/2001 | Dorenbosch et al. | 340/540 |
| 6,712,276 | B1 * | 3/2004 | Abali et al. | 235/492 |
| 6,982,640 | B2 * | 1/2006 | Lindsay et al. | 340/540 |
| 7,050,991 | B2 * | 5/2006 | Ogasawara | 705/22 |
| 2002/0059175 | A1 * | 5/2002 | Nakano | 707/1 |
| 2006/0178947 | A1 * | 8/2006 | Zsigmond et al. | 705/26 |

FOREIGN PATENT DOCUMENTS

| | | |
|---|---|---|
| JP | 2002-295960 | 10/2002 |
| JP | 2003-263543 | 9/2003 |
| JP | 2004-078743 | 3/2004 |
| JP | 2004-080355 | 3/2004 |

* cited by examiner

Primary Examiner—Toan N. Pham
(74) Attorney, Agent, or Firm—Squire Sanders & Dempsey L.L.P.

(57) ABSTRACT

An ingredient freezing system which provides accident information about ingredients stored in a refrigerator, the system including, a reading unit which obtains identification information of IC tags attached to the ingredients stored in a refrigerator, an identification information sending unit which sends the identification information obtained by the reading unit, an accident information providing unit which saves the accident information about the ingredients, relating to the identification information and outputs accident information related to the identification information when receiving the identification information from the identification information sending unit, an accident information obtaining unit which receives the accident information sent from the accident information providing unit, and a notification unit which notifies the accident information received by the accident information obtaining unit.

24 Claims, 2 Drawing Sheets

GOODS MANAGEMENT SYSTEM, INGREDIENT FREEZING SYSTEM, INGREDIENT MANAGING METHOD AND PROGRAM RECORDING MEDIUM

BACKGROUND OF THE INVENTION

1. Field of the Invention

The present invention relates to a goods management system which obtains information on goods by reading IC tags attached to goods such as ingredients, an ingredient freezing system, an ingredient managing method, and a program recording medium.

2. Description of Related Art

A refrigerator which reads information on names or numbers of ingredients to be stored therein by reading IC tags attached to the ingredients and obtains recipes corresponding to the ingredients via network is conventionally known (referring to Japanese Unexamined Patent Application, First Publication No. 2004-80355). A refrigerator which manages the freshness date or the like by reading information on ingredients recorded in IC tags is also known (referring to Japanese Unexamined Patent Application, First Publication No. 2003-263543).

In addition, a refrigerator which reads information about contents, expiration date, and freshness date of the ingredients, and notifies that the expiration date or the freshness date of the ingredient is imminent is known (referring to Japanese Unexamined Patent Application, First Publication No. 2002-295960). Furthermore, a system which consumers can browse traceability information of the ingredient, which shows a history of the ingredient, by first and second process manufacturers' recording the traceability information in a database via the Internet, is known (referring to Japanese Unexamined Patent Application, First Publication No. 2004-78743).

These above-referred documents teach technologies about a refrigerator which obtains information about ingredients by reading IC tags attached to the ingredients and obtains other information about the ingredients via network. The information which the refrigerator obtains is on name, number, freshness date, stock, where the ingredient is bought, or recipe and the like. This information is mainly related to a stock management or cooking.

Recently, consumers' attention on safety of ingredients is increasing and systems which disclose the traceability information are being developed. However it is impossible for consumers to obtain information about an accident such as food poisoning or plague immediately after it occurs. Even though such information is obtained, consumers sometimes do not remember whether there are any ingredients related to the accident. Therefore, consumers can not utilize the safety information on ingredients in such case.

SUMMARY OF THE INVENTION

The present invention provides a goods management system which provides information about goods, the system including, a reading unit which obtains identification information from IC tags attached to the goods, an identification information sending unit which sends the identification information obtained by the reading unit, an information providing unit which saves the information about the goods relating to the identification information and outputs information related to the identification information when receiving the identification information from the identification information sending unit, an information obtaining unit which receives the information sent from the information providing unit, and a notification unit which notifies the information received by the information obtaining unit.

The present invention also provides an ingredient freezing system which provides accident information about ingredients stored in a refrigerator, the system including a reading unit which obtains identification information of IC tags attached to the ingredients stored in a refrigerator, an identification information sending unit which sends the identification information obtained by the reading unit, an accident information providing unit which saves the accident information about the ingredients, relating to the identification information and outputs accident information related to the identification information when receiving the identification information from the identification information sending unit, an accident information obtaining unit which receives the accident information sent from the accident information providing unit, and a notification unit which notifies the accident information received by the accident information obtaining unit.

The sending and receiving of the identification information and the accident information may be carried out via a telecommunication line.

The ingredient freezing system of the present invention may further include a certification information saving unit which saves certification information; a certification information sending unit which sends the certification information saved in the certification information saving unit; and a certification information verification unit which verifies the certification information sent from the certification information sending unit, and the accident information providing unit may send the accident information to the accident information obtaining unit when the certification information is verified by the certification information verification unit.

The ingredient freezing system of the present invention may further include an IP address saving unit which saves an IP address of the accident information providing unit relating to the identification information, and the identification information sending unit may send the identification information to the accident information providing unit which has the IP address corresponding to the identification information obtained by the reading unit.

The identification information sending unit may send the identification information obtained by the reading unit to the accident information providing unit when the ingredients are put in the refrigerator or when the ingredients are taken out from the refrigerator.

The notification unit may include at least any one of a display device which displays the accident information as images, or a speaker which outputs the accident information as sounds.

The notification unit may send the accident information by e-mail via a telecommunication line.

The present invention further provides a recording medium on which a program is recorded for providing information about ingredients stored in a refrigerator, the program including a first step of obtaining identification information in IC tags attached to the ingredients by a reading unit, a second step of sending the identification information which the reading unit obtains by an identification information sending unit, a third step of saving accident information about the ingredients, relating to the identification information by an information providing unit, a fourth step of outputting the accident information related to the identification information by the information providing unit when receiving the identification information from the identification information sending unit, a fifth step of receiving the accident information sent from the information providing unit by an information obtaining unit, and a sixth step of notifying about the accident information which the information obtaining unit receives by a notification unit.

The second step, the fourth step, and the fifth step may be carried out via a telecommunication line.

The program may further include a step of sending certification information which is saved in a certification information saving unit by a certification information sending unit; and a step of verifying the certification information sent from the certification information sending unit by a certification information verification unit, and the fourth step may be carried out when the certification information is verified by the certification information verification unit.

The program may further include a step of saving an IP address of the accident information providing unit relating to the identification information by an IP address saving unit, and the second step may be carried out in the accident information providing unit which has the IP address corresponding to the identification information obtained by the reading unit.

The second step may be carried out when the ingredients are put in the refrigerator or when the ingredients are taken out from the refrigerator.

The sixth step may be carried out by a display device which displays the accident information as images, or a speaker which outputs the accident information as sounds.

The sixth step may also be carried out by sending the accident information by e-mail via a telecommunication line.

The present invention still further provides a method for managing ingredients which includes, a first step of obtaining identification information in IC tags attached to the ingredients by a reading unit, a second step of sending the identification information which the reading unit obtains by an identification information sending unit, a third step of saving accident information about the ingredients, relating to the identification information by an information providing unit, a fourth step of outputting the accident information related to the identification information by the information providing unit when receiving the identification information from the identification information sending unit, a fifth step of receiving the accident information sent from the information providing unit by an information obtaining unit, and a sixth step of notifying the accident information which the information obtaining unit receives by a notification unit.

The second step, the fourth step, and the fifth step may be carried out via a telecommunication line.

The method for managing ingredients may further include a step of sending certification information which is saved in a certification information saving unit by a certification information sending unit; and a step of verifying the certification information sent from the certification information sending unit by a certification information verification unit, and the fourth step may be carried out when the certification information is verified by the certification information verification unit.

The method for managing ingredients may further include a step of saving an IP address of the accident information providing unit relating to the identification information by an IP address saving unit, and the second step may be carried out in the accident information providing unit which has the IP address corresponding to the identification information obtained by the reading unit.

The second step may be carried out when the ingredients are put in the refrigerator or when the ingredients are taken out from the refrigerator.

The sixth step may be carried out by a display device which displays the accident information as images, or a speaker which outputs the accident information as sounds.

The sixth step may also be carried out by sending the accident information by e-mail via a telecommunication line.

DETAILED DESCRIPTION OF THE INVENTION

An explanation of an ingredient freezing system which is an embodiment of the present invention is given, referring to drawings.

Figure 1:
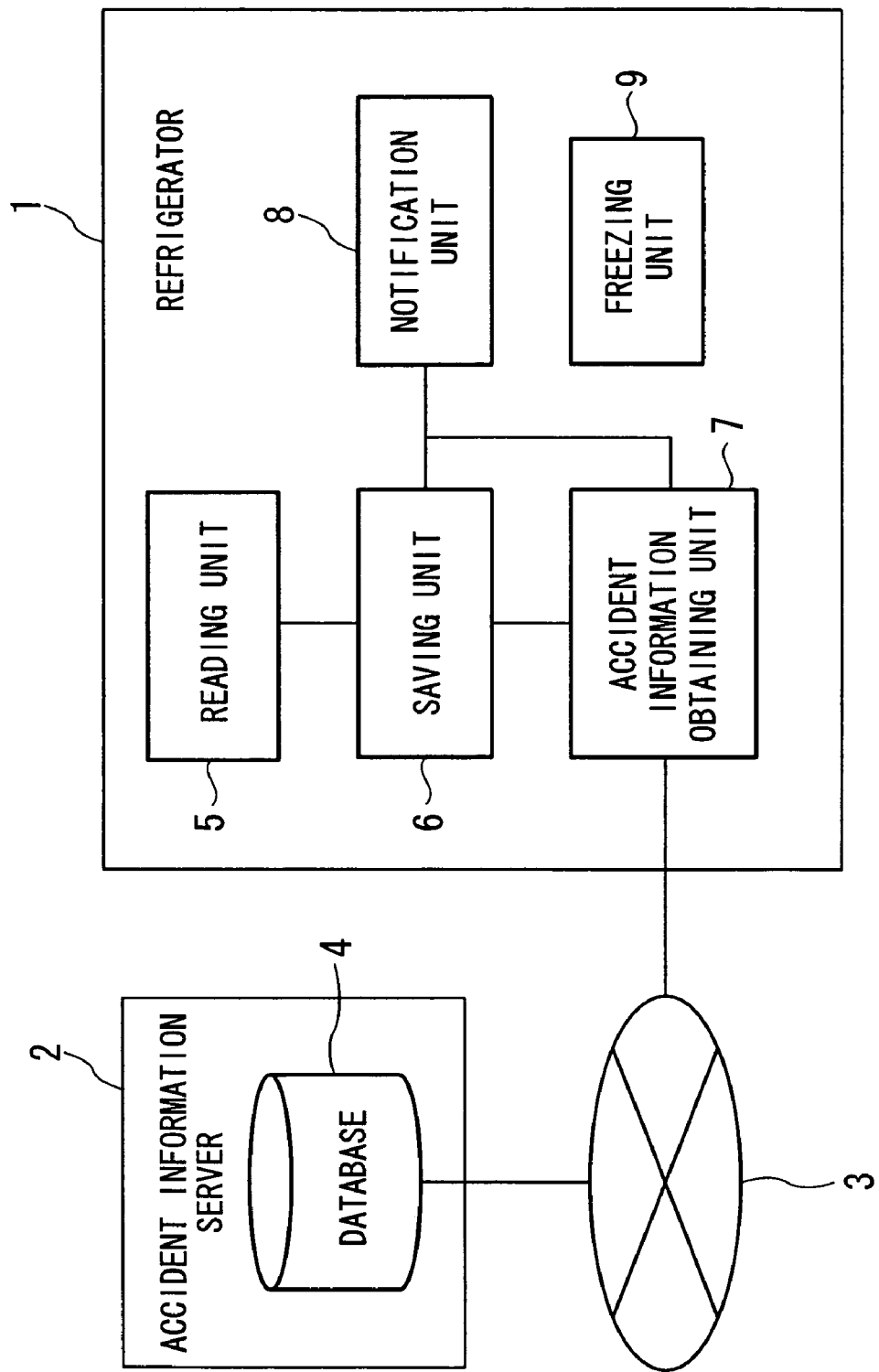
FIG. 1 is a schematic view which shows the structure of an ingredient freezing system according to an embodiment of the present invention.

FIG. 1 is a schematic view which shows the structure of an ingredient freezing system according to an embodiment of the present invention. The ingredient freezing system includes a refrigerator 1 and an accident information server 2. The refrigerator 1 and the accident information server 2 are connected by a telecommunication line 3 so as to be able to send or receive data.

The accident information server 2 has a database 4. "Accident information" is recorded in the database 4, related to the identification data recorded in IC tags which are attached to ingredients. The phrase "accident information" means information about whether there is risk of being infected by food poisoning or becoming ill by eating ingredients to which IC tags are attached. When food poisoning or illness is caused by one ingredient, an update of the accident information is carried out by a service provider which provides the ingredient freezing system of the embodiment. When the accident information server 2 obtains new information, the accident information server 2 updates the accident information recorded in the database 4 to the latest one.

In addition, the accident information server 2 receives "ingredient information" from the refrigerator 1 via the telecommunication line 3. The phrase "ingredient information" means information about the ingredients stored in the refrigerator 1. Ingredient information includes identification information of the ingredients. When the accident information server 2 receives the ingredient information, the accident information server 2 determines whether there is any accident information corresponding to the identification data, referring to the database 4. A determination result is sent to the refrigerator 1 via the telecommunication line 3.

The refrigerator 1 has a reading unit 5, a saving unit 6, an accident information obtaining unit 7, a notification unit 8 and a freezing unit 9.

The reading unit 5 is a unit which reads information recorded in IC tags attached to the ingredients. Identification data such as lot number is recorded in the IC tags. The lot number is a number given to ingredients which are made or processed consistently under the same conditions. The reading unit 5 reads identification data from the IC tags attached to ingredients or packages thereof, and outputs the data to the saving unit 6.

The saving unit 6 includes a memory device such as hard disk. The saving unit 6 saves identification data output from the reading unit 5. Identification data of ingredients stored in the refrigerator 1 are saved in the saving unit 6 in a cumulative manner.

The accident information obtaining unit 7 reads the identification data accumulated in the saving unit 6, and sends it to the accident information server 2 via telecommunication line 3 as the ingredient information. The accident information obtaining unit 7 also receives the accident information sent from the accident information server 2 via the telecommunication line 3 and outputs the received accident information to the notification unit 8.

The notification unit 8 is an output device including displays or speakers. When the notification unit 8 obtains accident information output from the accident information obtaining unit 7, the notification unit 8 outputs information related to the accident information as images on the display or as sounds from the speaker. The user of the ingredient freezing system of the embodiment can be notified that there is a risk of being infected with food poisoning or becoming ill by eating the ingredients stored in the refrigerator 1.

The freezing unit 9 is a freezing device which maintains the refrigerator 1 at a predetermined temperature so that the ingredients stored in the refrigerator 1 are not spoiled.

An explanation of a process of the ingredient freezing system of this embodiment is given.

Figure 2:
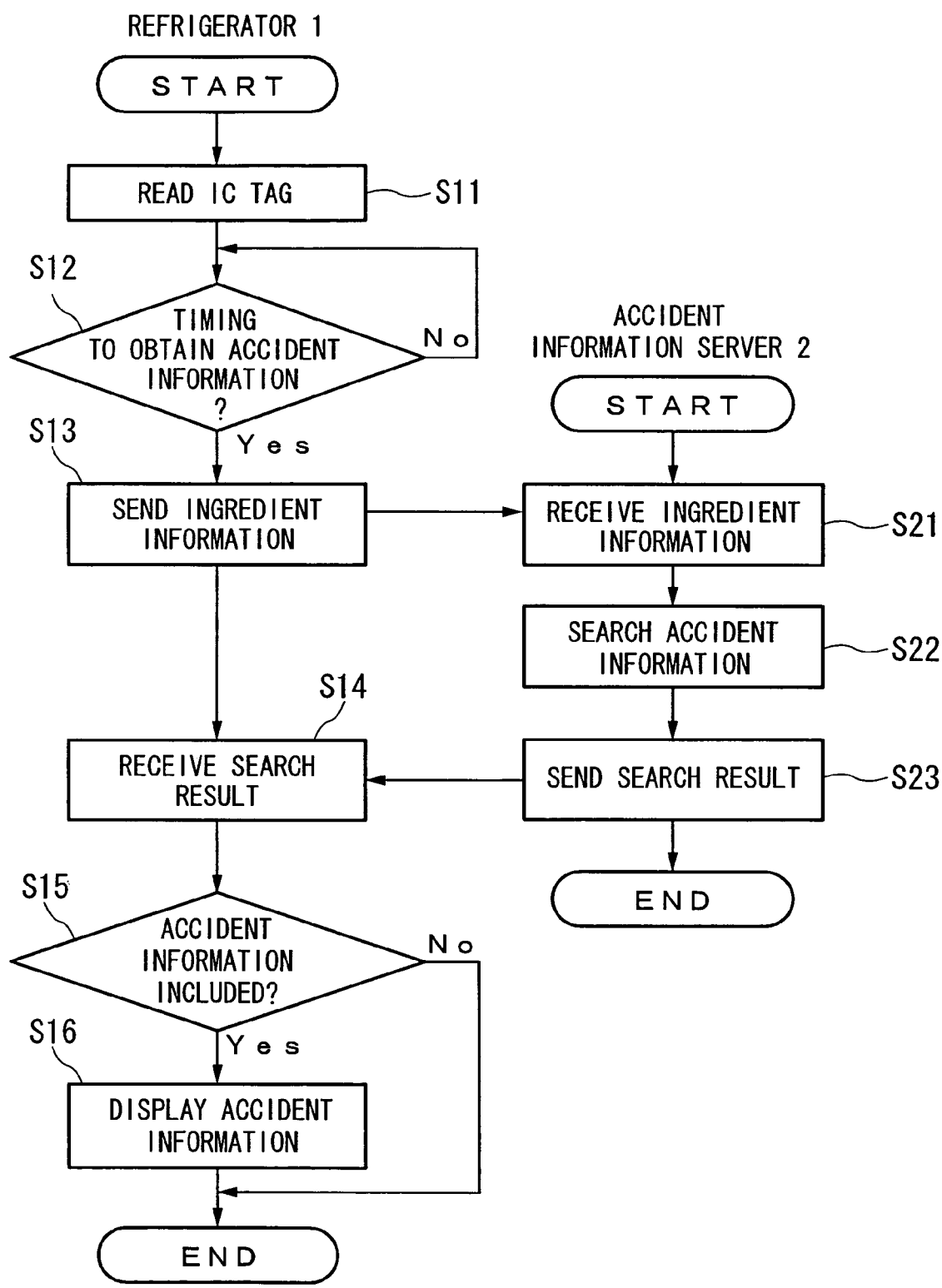
FIG. 2 is a flowchart which shows a process flow of the ingredient freezing system according to an embodiment of the present invention FIG. 1.

FIG. 2 is a flow chart which shows the process flow of the ingredient freezing system.

First, the reading unit 5 reads identification information from the IC tags attached to the ingredients stored in the refrigerator 1 (step S11). Then a determination as to whether it is time to obtain accident information is carried out (step S12). In this embodiment, the accident information obtaining unit 7 obtains the accident information when a predetermined interval has passed. The refrigerator 1 has a time measurement unit (not illustrated), so as to measure the time interval.

When the time interval has not passed, the determination is "No" in step S12. The process carries out step S12 again and continues measuring the time interval. When the time measurement unit recognizes that the time interval has passed, the determination is "Yes" in step S12, and the accident information obtaining unit 7 reads identification information recorded in the saving unit 6.

The accident information obtaining unit 7 sends the ingredient information which includes identification information to the accident information server 2 via the telecommunication line 3 (step S13). The accident information server 2 receives the ingredient information sent from the refrigerator 1 via the telecommunication line 3 (step S21).

The accident information server 2 searches whether accident information corresponding to the identification information included in the received ingredient information is recorded in the database 4 (step S22). The accident information server 2 sends the search result of the database 4 to the accident information obtaining unit 7 of the refrigerator 1 via the telecommunication line 3 (step S23). The accident information obtaining unit 7 of the refrigerator 1 receives the search result sent from the accident information server 2 (step S14).

The accident information obtaining unit 7 determines whether accident information is included in the received search result (step S15). When accident information is not included in the search result, the determination is "No" in step S15 and the process shown in FIG. 2 is finished. In this case, since there is no risk of food poisoning or illness, the user of the ingredient freezing system of the embodiment can eat the ingredients safely.

When accident information is included in the search result, the determination is "Yes" in step S15 and the accident information is notified by the notification unit 8 (step S16). For example, the accident information is displayed as images on the screen attached to the refrigerator 1, or is output as sounds from the speaker. Thereby the user of the ingredient freezing system of the embodiment can be notified that there is a risk of being infected with food poisoning or becoming ill by eating the ingredients stored in the refrigerator 1.

In the aforementioned step S12, although the timing for obtaining accident information is set when the predetermined time interval has passed, the present invention is not limited to such a constitution. For example, the timing for obtaining accident information may be set when ingredients are put in the refrigerator 1 by the reading unit 5 reading IC tags attached to the ingredients. In this constitution, consumers can make sure whether there is any accident information about the ingredients when they store the ingredients in the refrigerator 1.

The timing for obtaining accident information may also be set when ingredients are taken out from the refrigerator 1 by the reading unit 5 reading the IC tags attached to the ingredients. In this constitution, consumers can make sure whether there is any accident information about the ingredients when they take out the ingredients for cooking from the refrigerator 1.

In the aforementioned step S23, although the search result is sent to the accident information obtaining unit 7 of the refrigerator 1 regardless of the existence of any related accident information in the database 4 of the accident information server 2, the present invention is not limited to such a constitution. The search result may be sent to the accident information obtaining unit 7 of the refrigerator 1 only when any related accident information exists in the database 4.

In the aforementioned step S15, although the determination as to whether there is accident information in the search result is carried out in the refrigerator 1, the present invention is not limited to such a constitution. The determination as to whether there is accident information in the search result may be carried out in the accident information server 2.

In the aforementioned step S16, although the accident information is notified to the user by the notification unit 8 included in the refrigerator 1, the present invention is not limited to such a constitution. A notifying device may be provided instead of or besides the notification unit 8 which notifies the accident information by e-mail to the personal computer or mobile phone of the user of the ingredient freezing system of the embodiment, the producer and the process manufacturer of the ingredients and retail stores via the telecommunication line 3 when the accident information is included in the search result which the accident information obtaining unit 7 receives.

In addition, in the ingredient freezing system of this embodiment, an IP address saving unit which saves an IP address of the accident information server 2 corresponding to class identification information which is used to identify a kind and product class of the ingredients may be provided in the refrigerator 1 besides recording the class identification information in the IC tags attached to the ingredients. In this constitution, the accident information server 2 can be changed, corresponding to the kind and product class of the ingredients.

Furthermore, in the ingredient freezing system of this embodiment, an IP address saving unit which has a certification information saving unit which saves certification information may be provided besides providing a certification information verification unit in the accident information server 2. At the same time, the system may be constituted so that the accident information server 2 sends the search result to the refrigerator 1 only when the certification information saved in the certification information saving unit is verified by the certification information verification unit.

In this constitution, the ingredient freezing system of the embodiment can be opened only by the users which have the certification information.

In the aforementioned embodiment, although accident information about ingredients stored in a refrigerator is notified, the present invention is not limited to such constitution. For example, a goods management system may be constructed by notifying exchange information about toners and toner cartridges used in printing devices (such as printers), problem information about commodities and spare parts used in electric devices (such as batteries), or accident information about medicines stored in a medicine case.

In the above described embodiment, a program for carrying out the functions of the accident information server 2, the saving unit 6 and the accident information obtaining unit 7 may be recorded in a medium which is readable by computers. And the control of the ingredient freezing system may also be carried out by making a computer system read the program recorded in the medium. The term "computer system" includes operating systems and hardware such as that of peripherals.

The term "a medium which is readable by computers" includes media which dynamically maintain the program for a short period of time, such as a communication line when the program is sent via a telecommunication line such as the Internet or a communication line such as phone line, and media which maintain the program for a certain period of time, such as a volatile memory inside a computer system which operates as the accident information server or client when the program is sent in the above-described manner.

The program may be one to carry out a part of the aforementioned functions, and may also be one which enables the computer system to carry out the aforementioned functions by operating together with a program recorded in the computer system.

This explanation of a preferable embodiment of the present invention is not intended to be limiting. Those skilled in the art should understand that they can make various changes, substitutions and alterations herein without departing from the spirit and scope of the present invention in its broadest form.

What is claimed is:

1. An ingredient freezing system which provides accident information about ingredients stored in a refrigerator, the system comprising:
    a reading unit which obtains identification information of IC tags attached to the ingredients stored in the refrigerator;
    an identification information sending unit which sends the identification information obtained by the reading unit;
    an accident information providing unit which saves accident information about the ingredients, the accident information comprising data describing one or more prior incidents related to one or more of the ingredients, relating to the identification information and outputs accident information related to the identification information when receiving the identification information from the identification information sending unit;
    an accident information obtaining unit which receives the accident information sent from the accident information providing unit; and
    a notification unit which notifies the accident information received by the accident information obtaining unit.

2. The ingredient freezing system according to claim 1, wherein the sending and receiving of the identification information and the accident information are carried out via a telecommunication line.

3. The ingredient freezing system according to claim 1, further comprising:
    a certification information saving unit which saves certification information;
    a certification information sending unit which sends the certification information saved in the certification information saving unit; and
    a certification information verification unit which verifies the certification information sent from the certification information sending unit,
    wherein the accident information providing unit sends the accident information to the accident information obtaining unit when the certification information is verified by the certification information verification unit.

4. The ingredient freezing system according to claim 1, further comprising:
    an IP address saving unit which saves an IP address of the accident information providing unit relating to the identification information,
    wherein the identification information sending unit sends the identification information to the accident information providing unit which has the IP address corresponding to the identification information obtained by the reading unit.

5. The ingredient freezing system according to claim 1, wherein the identification information sending unit sends the identification information obtained by the reading unit to the accident information providing unit when at least any one of the ingredients are put in the refrigerator and when the ingredients are taken out from the refrigerator.

6. The ingredient freezing system according to claim 1, wherein the notification unit includes at least any one of a display device which displays the accident information as images, or a speaker which outputs the accident information as sounds.

7. The ingredient freezing system according to claim 1, wherein the notification unit sends the accident information by e-mail via a telecommunication line.

8. A recording medium on which a program is recorded for providing information about ingredients stored in a refrigerator, the program comprising:
    a first step of obtaining identification information in IC tags attached to the ingredients by a reading unit;
    a second step of sending the identification information which the reading unit obtains by an identification information sending unit;
    a third step of saving accident information about the ingredients, relating to the identification information by an information providing unit, the accident information comprising data describing one or more prior incidents related to one or more of the ingredients;
    a fourth step of outputting the accident information related to the identification information by the information providing unit when receiving the identification information from the identification information sending unit;
    a fifth step of receiving the accident information sent from the information providing unit by an information obtaining unit; and
    a sixth step of notifying the accident information which the information obtaining unit receives by a notification unit.

9. The recording medium according to claim 8, wherein the second step, the fourth step, and the fifth step are carried out via a telecommunication line.

10. The recording medium according to claim 8, the program further comprising:
a step of sending certification information which is saved in a certification information saving unit by a certification information sending unit; and
a step of verifying the certification information sent from the certification information sending unit by a certification information verification unit,
wherein the fourth step is carried out when the certification information is verified by the certification information verification unit.

11. The recording medium according to claim 8, the program further comprising:
a step of saving an IP address of the accident information providing unit relating to the identification information by an IP address saving unit,
wherein the second step is carried out in the accident information providing unit which has the IP address corresponding to the identification information obtained by the reading unit.

12. The recording medium according to claim 8, wherein the second step is carried out when the ingredients are put in the refrigerator or when the ingredients are taken out from the refrigerator.

13. The recording medium according to claim 8, wherein the sixth step is carried out by a display device which displays the accident information as images, or a speaker which outputs the accident information as sounds.

14. The recording medium according to claim 8, wherein the sixth step is carried out by sending the accident information by e-mail via a telecommunication line.

15. A method for managing ingredients comprising:
a first step of obtaining identification information in IC tags attached to the ingredients by a reading unit;
a second step of sending the identification information which the reading unit obtains by an identification information sending unit;
a third step of saving accident information about the ingredients, relating to the identification information by an information providing unit the accident information comprising data describing one or more prior incidents related to one or more of the ingredients;
a fourth step of outputting the accident information related to the identification information by the information providing unit when receiving the identification information from the identification information sending unit;
a fifth step of receiving the accident information sent from the information providing unit by an information obtaining unit; and
a sixth step of notifying the accident information which the information obtaining unit receives by a notification unit.

16. The method for managing ingredients according to claim 15, wherein the second step, the fourth step, and the fifth step are carried out via a telecommunication line.

17. The method for managing ingredients according to claim 15, further comprising:
a step of sending certification information which is saved in a certification information saving unit by a certification information sending unit; and
a step of verifying the certification information sent from the certification information sending unit by a certification information verification unit,
wherein the fourth step is carried out when the certification information is verified by the certification information verification unit.

18. The method for managing ingredients according to claim 15, further comprising:
a step of saving an IP address of the accident information providing unit relating to the identification information by an IP address saving unit,
wherein the second step is carried out to the accident information providing unit which has the IP address corresponding to the identification information obtained by the reading unit.

19. The method for managing ingredients according to claim 15, wherein the second step is carried out when the ingredients are put in the refrigerator or when the ingredients are taken out of the refrigerator.

20. The method for managing ingredients according to claim 15, wherein the sixth step is carried out by a display device which displays the accident information as images, or a speaker which outputs the accident information as sounds.

21. The method for managing ingredients according to claim 15, wherein the sixth step is carried out by sending the accident information by e-mail via a telecommunication line.

22. An ingredient freezing system which provides accident information about ingredients stored in a refrigerator, the system comprising:
a reading unit which obtains identification information of IC tags attached to the ingredients stored in the refrigerator;
an identification information sending unit which sends the identification information obtained by the reading unit;
an accident information providing unit which saves accident information about the ingredients, relating to the identification information and outputs accident information related to the identification information when receiving the identification information from the identification information sending unit;
an accident information obtaining unit which receives the accident information sent from the accident information providing unit;
a notification unit which notifies the accident information received by the accident information obtaining unit;
a certification information saving unit which saves certification information;
a certification information sending unit which sends the certification information saved in the certification information saving unit; and
a certification information verification unit which verifies the certification information sent from the certification information sending unit,
wherein the accident information providing unit sends the accident information to the accident information obtaining unit when the certification information is verified by the certification information verification unit.

23. A recording medium on which a program is recorded for providing information about ingredients stored in a refrigerator, the program comprising:
a first step of obtaining identification information in IC tags attached to the ingredients by a reading unit;
a second step of sending the identification information which the reading unit obtains by an identification information sending unit;
a third step of saving accident information about the ingredients, relating to the identification information by an information providing unit;
a fourth step of outputting the accident information related to the identification information by the information providing unit when receiving the identification information from the identification information sending unit;

a fifth step of receiving the accident information sent from the information providing unit by an information obtaining unit;

a sixth step of notifying the accident information which the information obtaining unit receives by a notification unit;

a step of sending certification information which is saved in a certification information saving unit by a certification information sending unit; and a step of verifying the certification information sent from the certification information sending unit by a certification information verification unit, wherein the fourth step is carried out when the certification information is verified by the certification information verification unit.

24. A method for managing ingredients comprising:

a first step of obtaining identification information in IC tags attached to the ingredients by a reading unit;

a second step of sending the identification information which the reading unit obtains by an identification information sending unit;

a third step of saving accident information about the ingredients, relating to the identification information by an information providing unit;

a fourth step of outputting the accident information related to the identification information by the information providing unit when receiving the identification information from the identification information sending unit;

a fifth step of receiving the accident information sent from the information providing unit by an information obtaining unit;

a sixth step of notifying the accident information which the information obtaining unit receives by a notification unit;

a step of sending certification information which is saved in a certification information saving unit by a certification information sending unit; and a step of verifying the certification information sent from the certification information sending unit by a certification information verification unit, wherein the fourth step is carried out when the certification information is verified by the certification information verification unit.

* * * * *

UNITED STATES PATENT AND TRADEMARK OFFICE
CERTIFICATE OF CORRECTION

PATENT NO. : 7,391,318 B2 Page 1 of 1
APPLICATION NO. : 11/269706
DATED : June 24, 2008
INVENTOR(S) : Mikio Higashi It is certified that error appears in the above-identified patent and that said Letters Patent is hereby corrected as shown below:

On the Title Page of the Patent

In Item (75):

Please correct the inventor's address, which should read:

--Kawasaki-shi--

Signed and Sealed this

Twenty-first Day of October, 2008

JON W. DUDAS
*Director of the United States Patent and Trademark Office*